(12) United States Patent
Pang

(10) Patent No.: US 6,925,522 B2
(45) Date of Patent: Aug. 2, 2005

(54) DEVICE AND METHOD CAPABLE OF CHANGING CODES OF MICRO-CONTROLLER

(75) Inventor: Chia Yuan Pang, Taipei (TW)

(73) Assignee: Lite-On It Corporation, Taipei (TW)

( * ) Notice: Subject to any disclaimer, the term of this patent is extended or adjusted under 35 U.S.C. 154(b) by 0 days.

(21) Appl. No.: 10/316,012

(22) Filed: Dec. 11, 2002

(65) Prior Publication Data

US 2003/0084232 A1 May 1, 2003

Related U.S. Application Data

(63) Continuation-in-part of application No. 09/695,970, filed on Oct. 26, 2000, now abandoned.

(51) Int. Cl.[7] .............................................. G06F 12/00
(52) U.S. Cl. .......................................... 711/103; 713/1
(58) Field of Search ................................ 711/103, 104, 711/111, 100; 713/1, 2, 100; 710/267; 365/236

(56) References Cited

U.S. PATENT DOCUMENTS

| | | | | |
|---|---|---|---|---|
| 5,657,301 A | * | 8/1997 | Yoshikawa et al. | 711/111 |
| 5,859,993 A | * | 1/1999 | Snyder | 712/208 |
| 6,009,500 A | * | 12/1999 | Rossi | 711/162 |
| 6,078,548 A | * | 6/2000 | Jih | 365/236 |
| 6,102,963 A | * | 8/2000 | Agrawal | 716/17 |
| 6,115,814 A | * | 9/2000 | Lieber et al. | 713/2 |
| 6,253,281 B1 | * | 6/2001 | Hall | 711/112 |
| 6,457,099 B1 | * | 9/2002 | Gilbert | 711/115 |
| 6,631,520 B1 | * | 10/2003 | Theron et al. | 717/173 |
| 2004/0133771 A1 | * | 7/2004 | King et al. | 713/100 |

OTHER PUBLICATIONS

8031 Based T1 Model, Tecel Microcontrollers, www.tecel.com.*
PSD8XX/9XX Family, In–System Programmable Flash System Solution for 8–Bit MCUs, www.spoerle.com/suppliers/spoele_spots/second_edition/Stcan_inSystem2.html.*
80C31BH, 80C51BH, 80C51BHP, 87C51 Specification Update, Intel Corporation, www.intel.com, pp. 1–6, Dec. 1996.*
8XC52/54/58 CHMOS Single–Chip 8–BIT Microcontrollers, Intel corporation, www.intel.com, pp 1–23, Mar. 1996.*
MCS 51 8–BIT Control Oriented Microcontrollers, Intel Corporation, www.intel.com, pp 1–21, Mar. 1996.*
Application Note, An Introduction to the Intel MCS–51 Single–Chip Microcontroller Family, Intel corporation, www.intel.com, pp 1–30, Mar. 1996.*

(Continued)

Primary Examiner—Pierre-Michel Bataille
(74) Attorney, Agent, or Firm—Rabin & Berdo, PC

(57) ABSTRACT

A device and method capable of changing codes of a micro-controller comprises a micro-controller, an address latch, a flash memory, a static random access memory (SRAM), and a logic circuit. The flash memory has a renovation program and a general program recorded therein. The logic circuit can be a logic gate circuit, a programmable logic array, or a field programmable gate array. During a period of changing code, the renovation program of the flash memory controls the micro-controller to copy the renovation program itself into the SRAM and then makes the renovation program recorded in the SRAM control the micro-controller to replace the general program of the flash memory with a new program. Thereby, codes can be renewed without the need of replacing the original flash memory.

19 Claims, 10 Drawing Sheets

OTHER PUBLICATIONS

8–BIT Microcontroller with 4K Bytes Flash, www.atmel.com, pp 1–17, Feb. 2000.*

Interfacing the NM24C16 Serial EEPROM to the 8031 Microcontroller, Fairchild Semiconductor Corporation, www.fairsei.com, pp 1–7, 1998.*

COMPASS/51, Development Software, Production Languages Corporation, www.plcorp.com, pp 137–138, Mar. 1996.*

80C31BH/80C51BH/87C51 MCS–51 CHMOS Single–Chip Microcontroller, Intel Corporation, www.intel.com, pp 1–16, Jan. 1995.*

"Programmable Logic Devices—A Short Introduction", http://www.csit–sun.bub.ro/research/fpga/fpga_design/intro.html.*

Xicor Application Note, Interfacing the X25043/45 Watchdog Timer to 8051 Microcontrollers, Jan. 1996.*

8051 Cross Assembler User's Manual, MetalLink Corporation,Jan. 1996.*

* cited by examiner

US 6,925,522 B2

DEVICE AND METHOD CAPABLE OF CHANGING CODES OF MICRO-CONTROLLER

CROSS REFERENCE TO RELATED APPLICATION

This application is a continuation-in-part of U.S. application Ser. No. 09/695,970, filed on Oct. 26, 2000 now abandoned and entitled "Device capable of changing codes of micro-controller".

FIELD OF THE INVENTION

The present invention relates to a device and a method capable of changing codes of a micro-controller and, more particularly, to a device and a method which can change the codes of an 8031 micro-controller via an additional circuit and a built-in renovation program without replacing the original flash memory.

BACKGROUND OF THE INVENTION

As shown in FIG. 1, a conventional 8031 micro-controller system generally comprises an 8031 micro-controller 1, an address latch 2, a flash memory 3, and a static random access memory (SRAM) 4.

The multiplex bus (AD0~AD7) and the address latch enable (ALE) pin of the 8031 micro-controller 1 are respectively connected to the address latch 2 for storing address signals in the registers so as to facilitate the execution of reading and writing actions of the 8031 micro-controller 1. The output of the address latch 2 is connected to both the flash memory 3 and the SRAM 4. The outputs of the flash memory 3 and the SRAM 4 are connected to the multiplex bus (AD0~AD7). The address bus (A8~A15) of the 8031 micro-controller 1 is connected to both the flash memory 3 and the SRAM 4. The write enable (WE) pin and the output enable (OE) pin of the SRAM 4 are respectively connected to the read (RD) pin and the write (WR) pin of the 8031 micro-controller 1. The write enable (WE) pin and the output enable (OE) pin of the flash memory 3 are respectively connected to 5V and the program store enable (PSEN) pin of the 8031 micro-controller 1.

Due to property of the flash memory 3, the flash memory 3 is used as a read only memory (ROM) for storing machine codes of the 8031 micro-controller 1. It means that the flash memory 3 generally only can be read out but can't be written in when the 8031 micro-controller 1 fetches and executes machine codes. The SRAM 4 is the only place that the 8031 micro-controller 1 can write and retrieve data. Thus, the 8031 micro-controller 1 successively executes machine codes fetching from the flash memory 3, and stores the operation results to the SRAM. If it is necessary to renew the content of the flash memory 3, the only way is to replace the original flash memory with a new flash memory. Therefore, the cost will be relatively high.

SUMMARY OF THE INVENTION

Accordingly, one object of the present invention is to provide a device and a method capable of changing codes of an 8031 micro-controller by using a renovation program and a logic circuit (a programmable logic array (PAL) or an field programmable gate array (FPGA)). The logic circuit is connected between the 8031 micro-controller, the flash memory, and the static random access memory (SRAM) of the 8031 micro-controller system. The codes recorded in the flash memory can be renewed via the cooperation of the renovation program and the logic circuit so that it is not necessary to replace the original memory.

The various objects and advantages of the present invention will be more readily understood from the following detailed description when read in conjunction with the appended drawings, in which:

DETAILED DESCRIPTION OF THE PREFERRED EMBODIMENTS

Figure 1:
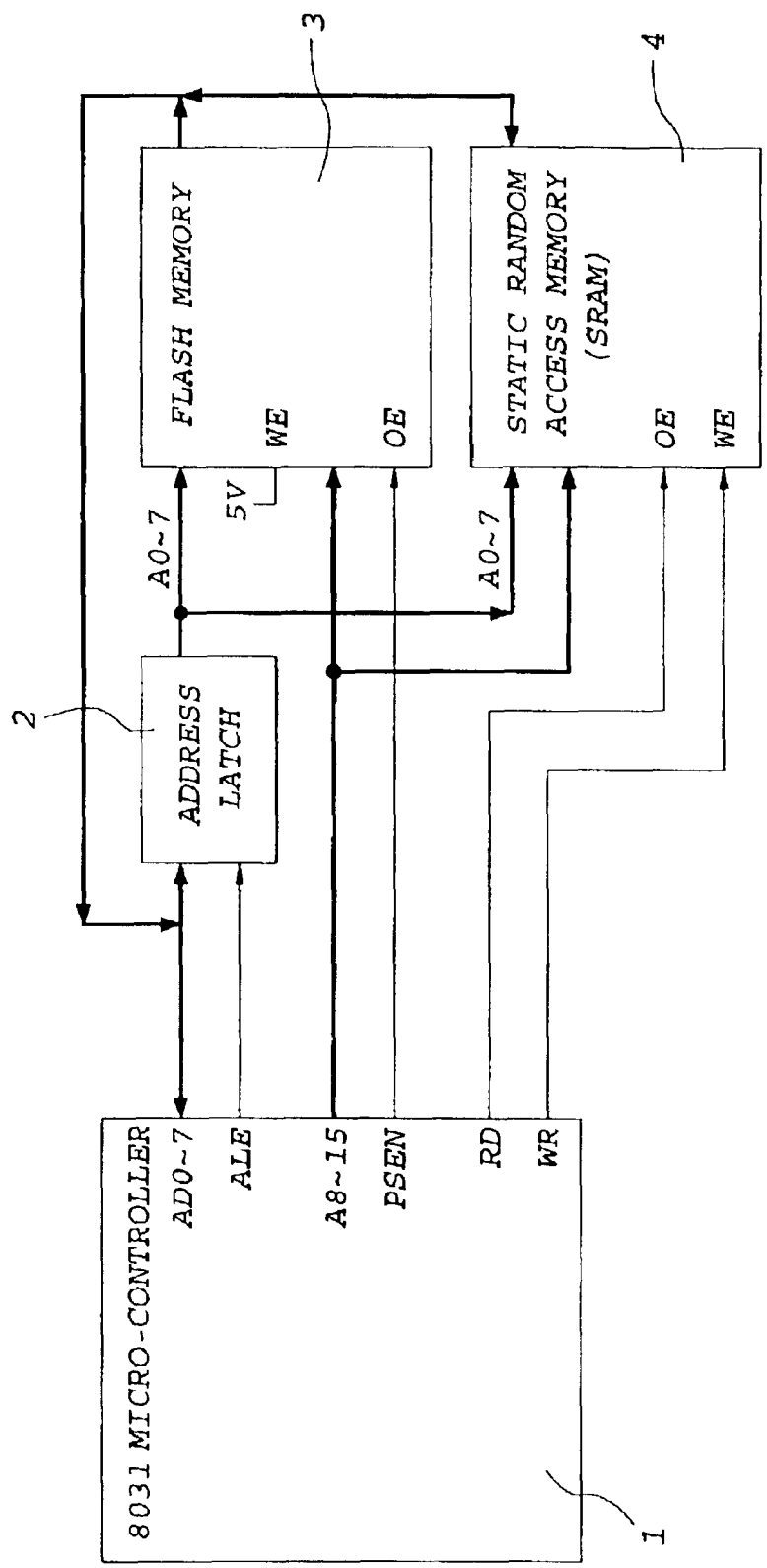
FIG. 1 is a block diagram of a prior art 8031 micro-controller system.
Figure 2:
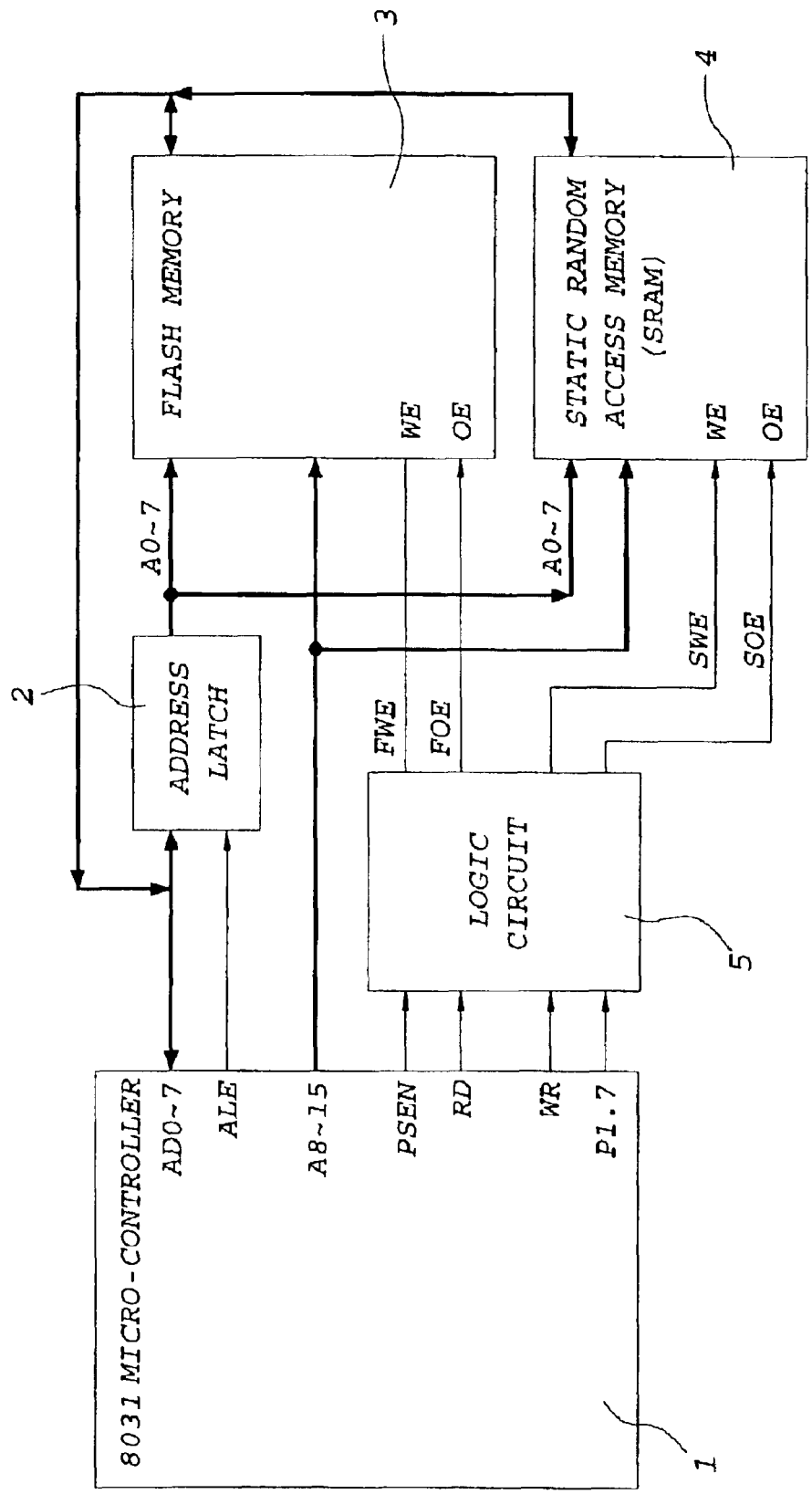
FIG. 2 is a block diagram of an 8031 micro-controller system of the present invention.

As shown in FIGS. 2, a device capable of changing codes of a micro-controller according to the present invention comprises an 8031 micro-controller 1, an address latch 2, a flash memory 3, a static random access memory (SRAM) 4, and a logic circuit 5.

The multiplex bus (AD0~AD7) and the address latch enable (ALE) pin of the 8031 micro-controller 1 are respectively connected to the address latch 2 for storing address signals in the registers so as to facilitate the execution of reading and writing actions of the 8031 micro-controller 1. The output of the address latch 2 is connected to both the flash memory 3 and the SRAM 4. The outputs of the flash memory 3 and the SRAM 4 are connected to the multiplex bus (AD0~AD7). The address bus (A8~A15) of the 8031 micro-controller 1 is connected to both the flash memory 3 and the SRAM 4.

The input terminals of the logic circuit 5 are respectively connected to the program store enable (PSEN) pin, the read (RD) pin, the write (WR) pin, and the seventh pin of port 1 (P1.7) of the 8031 micro-controller 1, i.e., an output port pin of the 8031 micro-controller 1. The output terminals (FWE, FOE, SWE, and SOE) of the logic circuit 5 are respectively connected to the write enable (WE) pin and the output enable (OE) pin of the flash memory 3 and the write enable (WE) pin and the output enable (OE) pin of the SRAM 4.

Figure 3:
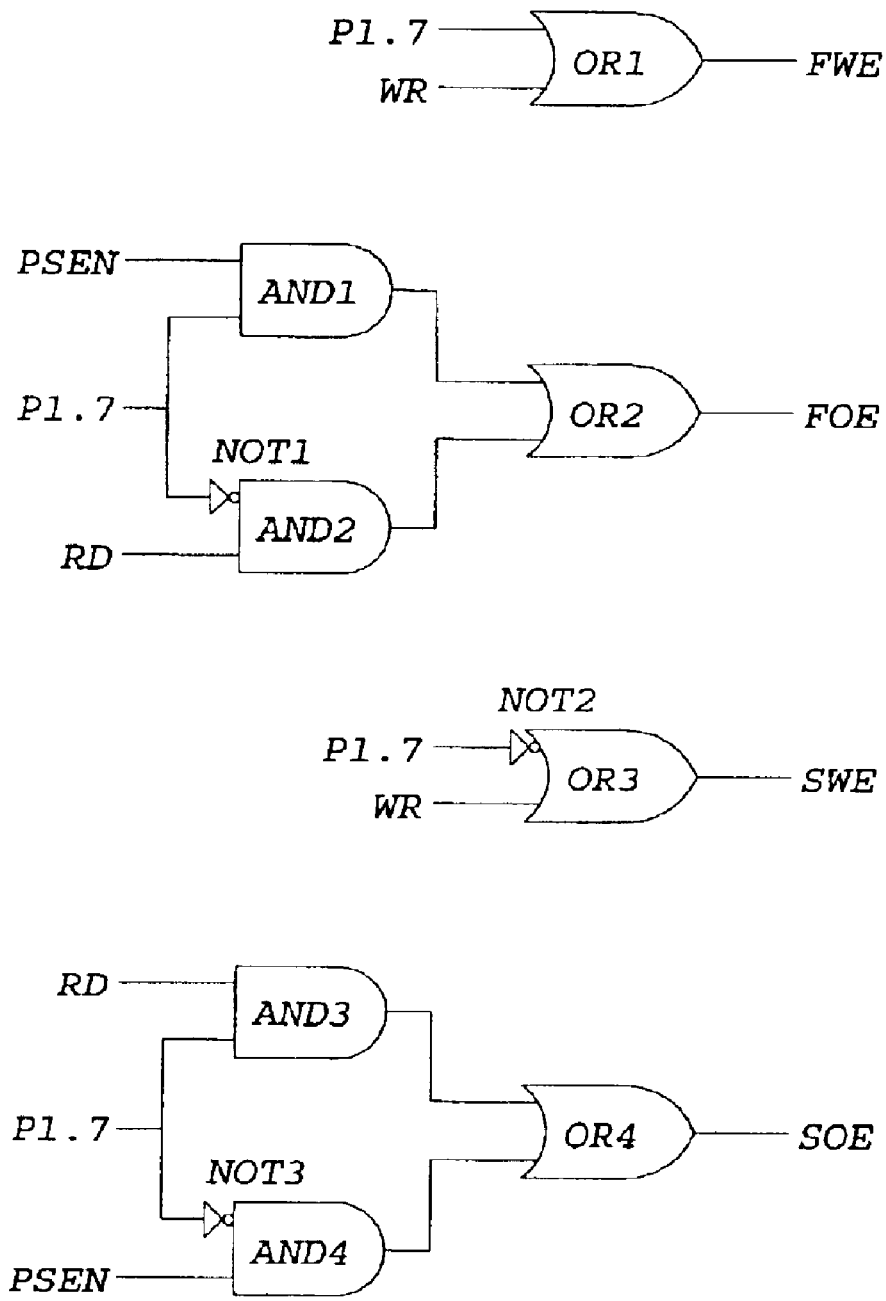
FIG. 3 is a logic circuit of the present invention.

As shown in FIG. 3, the logic circuit 5 comprises a plurality of AND gates (AND 1~AND 4), a plurality of OR gates (OR 1~OR 4), and a plurality of inverters (NOT 1~NOT 3). Also, the Boolean equations of the output terminals (FWE, FOE, SWE, and SOE) can be represented as following.

$FEW = P1.7 + WR$ $FOE = \overline{PSEN \cdot P1.7 + RD \cdot \overline{P1.7}}$ $SWE = WR + \overline{P1.7}$ $SOE = \overline{RD \cdot P1.7 + PSEN \cdot \overline{P1.7}}$ When the voltage of the P1.7 pin of the 8031 micro-controller 1 is high, i.e., P1.7=1, the outputs of the logic circuit 5 are: FWE=1, FOE=PSEN, SWE=WR, and SOE=RD. In this state, the device of the present invention operates at a general mode, which is the same as the operation of the conventional system.

When the voltage of the P1.7 pin of the 8031 micro-controller 1 is low, i.e. P1.7=0, the outputs of the logic circuit 5 are: FWE=WR, FOE=RD, SWE=1, and SOE=PSEN. In this state, the device of the present invention operates at a renovation mode so as to upgrade the flash memory 3. While P1.7=0, the 8031 micro-controller 1 fetches the machine codes from SRAM 4 and write operation results into the flash memory 3. It means that in renovation mode, the role of the flash memory 3 is exchanged with that of the SRAM 4 so that the flash memory 3 is rewritable and the SRAM 4 is only readable.

Figure 4:
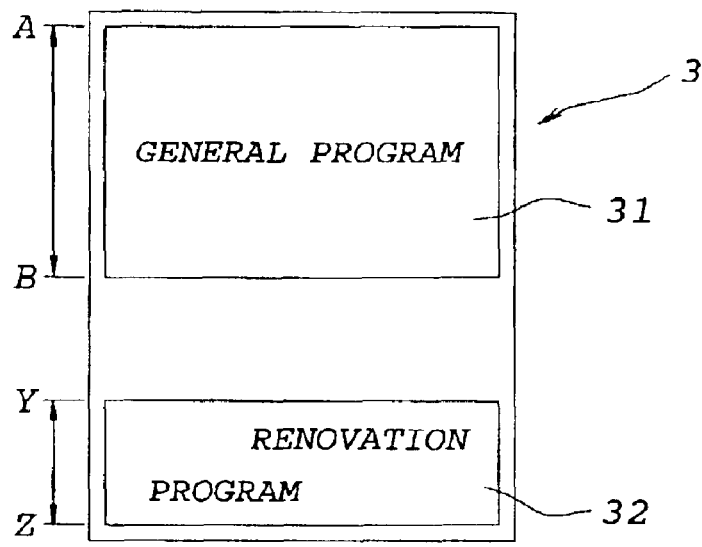
FIG. 4 is an arrangement of the programs recorded in a flash memory complied with the present invention before the codes are updated.

As shown in FIG. 4, the flash memory 3 stores a general program 31 and a renovation program 32. The general program 31 and renovation program 32 are recorded within the address A~B and Y~Z of the flash memory 3, respectively. In general mode, machine codes of the general program 31 are fetched and executed by the 8031 micro-controller 1. The renovation program 32 is used when the general program 31 needs to be upgraded.

Figure 5:
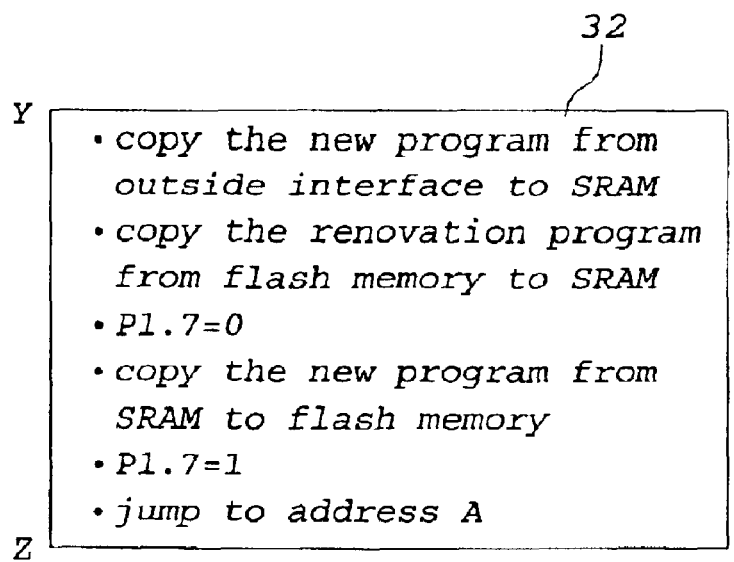
FIG. 5 is pseudo codes of the renovation program.

As shown in FIG. 5, the pseudo codes of the renovation program is described. According to the invention, the first procedure is to copy a new program from outside interface (not shown) to the location between the address C and D of the SRAM. The second procedure is to copy the renovation program located between the address Y and Z of the flash memory to the location between the address Y and Z of the SRAM. The third procedure is to set the P1.7 pin to low. The fourth procedure is to copy the new program located between the address C and D of the SRAM to the flash memory starting at address A. The fifth procedure is to set the P1.7 pin to high. The sixth procedure is to jump to address A.

Figure 6:
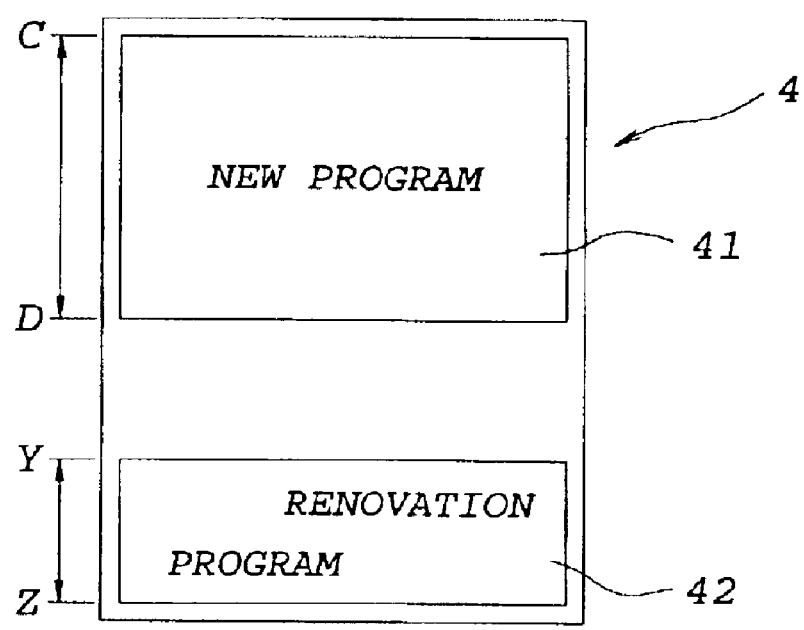
FIG. 6 is an arrangement of the programs recorded in a SRAM complied with the present invention while the code updating is processed.

FIG. 6 shows the content of the SRAM when the execution of the first and second procedures is completed. The new program 41 is stored within the address C~D of the SRAM 4, and the renovation program 42 is stored within the address Y~Z of the SRAM 4.

Figure 7:
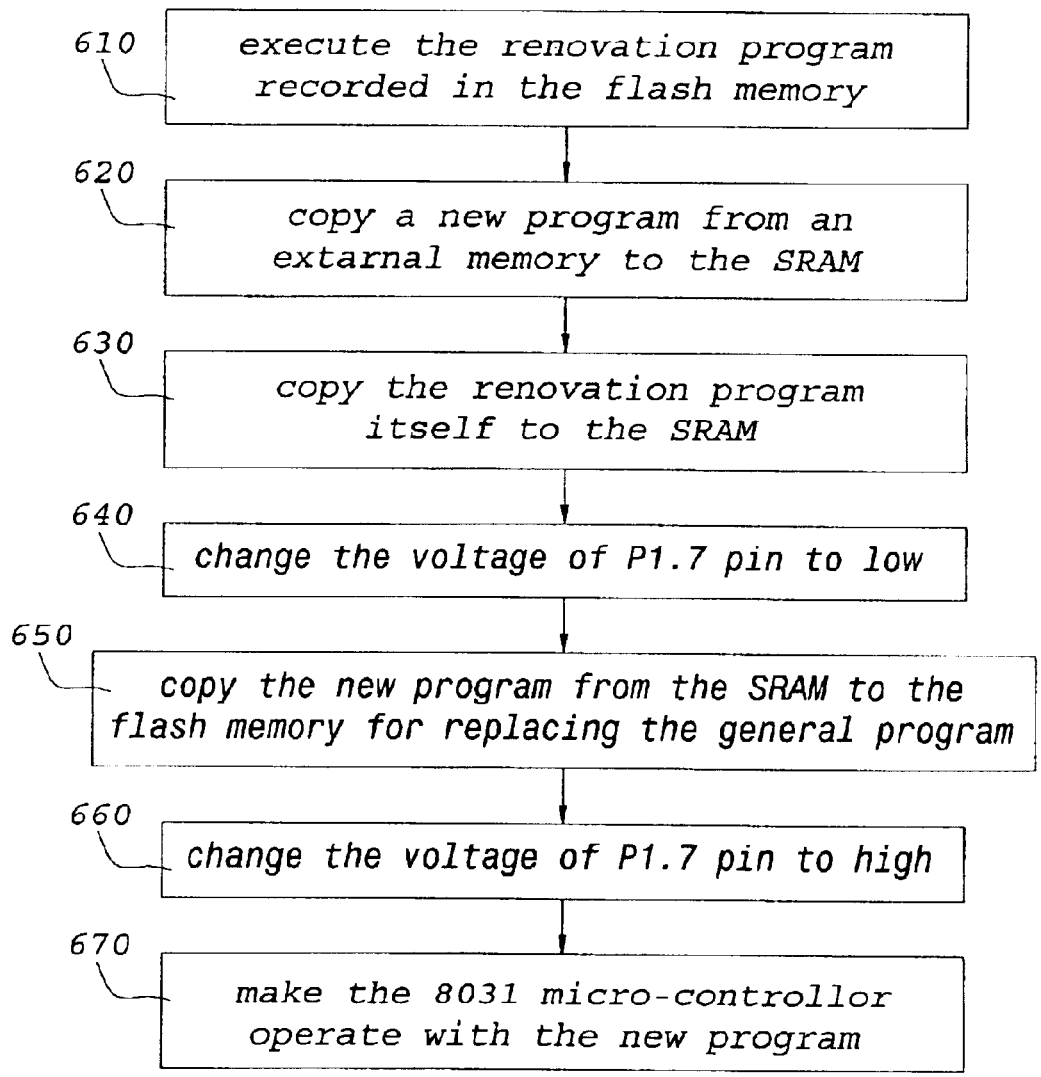
FIG. 7 is an operation flow chart for upgrading the general program of the flash memory complied with the present invention.

Please refer to FIG. 7, which is the operation flow chart for upgrading the general program 31 of the flash memory 3 complied with the present invention. The operation steps are described as following:

Step 610: At the beginning of the upgrading process, the 8031 micro-controller 1 will be activated to execute the renovation program 32 recorded in the flash memory 3.

Step 620: Then, the renovation program 32 will control the 8031 micro-controller 1 to copy a new program 41 from outside interface (not shown) to the SRAM 4. In this embodiment, the new program 41 is recorded within the address C~D of the SDRM 4.

Step 630: While the new program 31 is completely copied to the SRAM 4, the renovation program 32 will control the 8031 micro-controller 1 to copy itself to the SRAM 4. According to the present invention, the address space of the renovation program 42 in the SRAM 4 is identical to the address space of the renovation program 32 in the flash memory 3, i.e., the renovation program 42 will be recorded within the address Y~Z of the SRAM 4.

Figure 8:
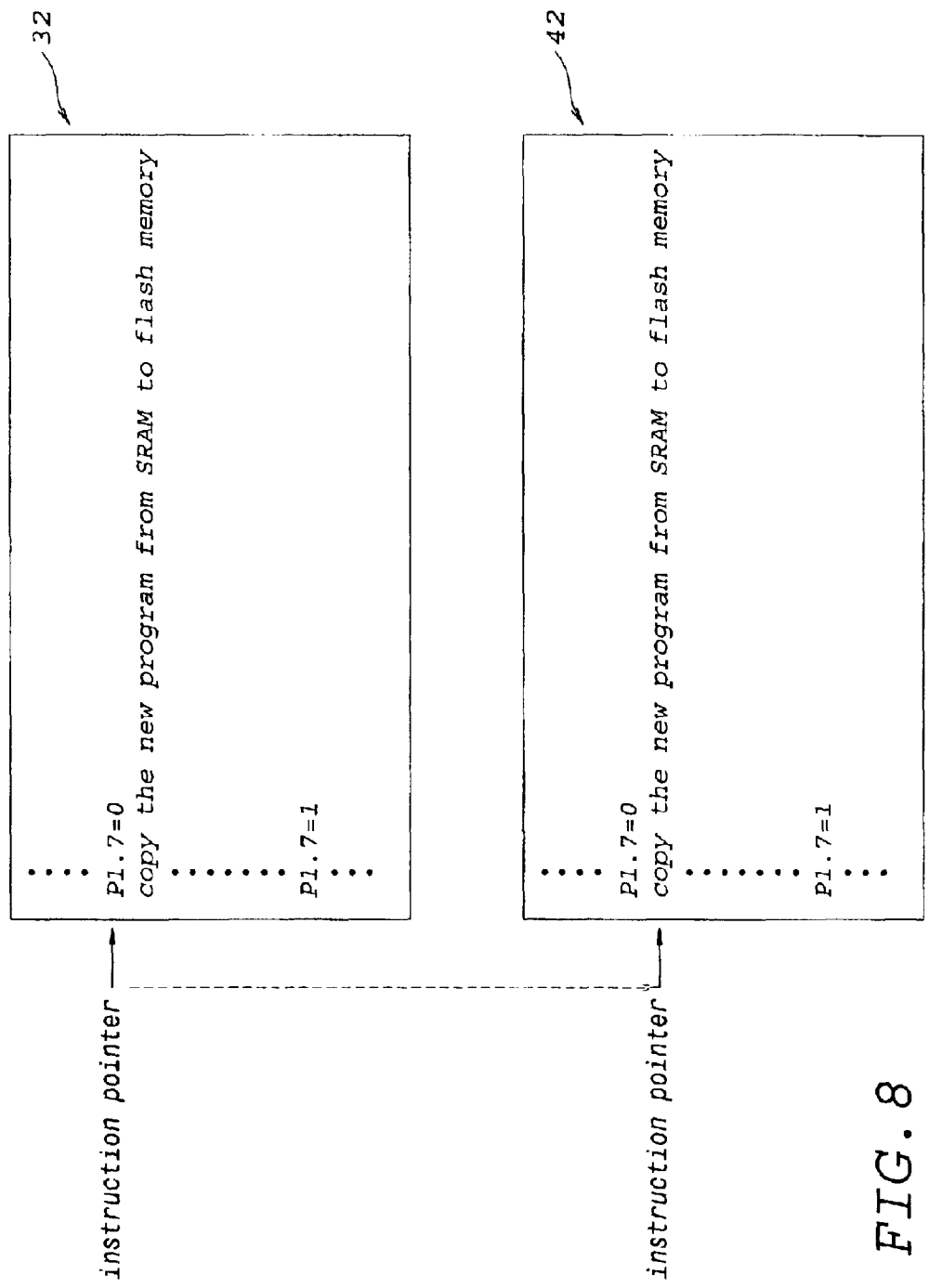
FIG. 8 is a schematic diagram of the running of the instruction pointer complied with the present invention.

Step 640: After the renovation program 42 is written into the SRAM 4 completely, the renovation program 32 of the flash memory 3 will control the 8031 micro-controller 1 to change the P1.7 pin to low, i.e., P1.7=0. Therefore, the mode is changed to the renovation mode. As well, since the addresses of renovation program 32 of the flash memory 3 and the renovation program 42 of the SRAM 4 are the same and the instruction pointer of the 8031 micro-controller 1 always points to the next machine code, the 8031 micro-controller 1 will fetch and execute the next machine code stored in the renovation program 42 of the SRAM 4 instead of the next machine stored in renovation program 32 of the flash memory 3. As shown in FIG. 8, it means that the instruction pointer of the 8031 micro-controller 1 will point to the next machine code recorded in the SRAM 4 after the P1.7 pin is changed to low.

Figure 9:
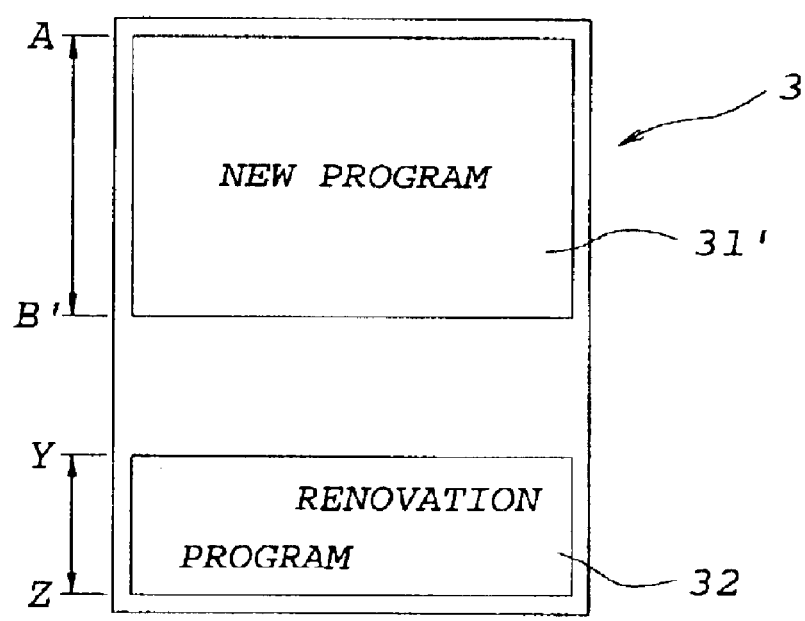
FIG. 9 is an arrangement of the programs recorded in a flash memory complied with the present invention after the codes are updated.

Step 650: Then, the renovation program 42 recorded in the SRAM 4 will control the 8031 micro-controller 1 to copy the new program 41 from the SRAM 4 to the flash memory 3 for replacing the general program 31. Please refer to FIG. 9. While the copying operation is completed, the new program 31' will be recorded within the address A~B'.

Figure 10:
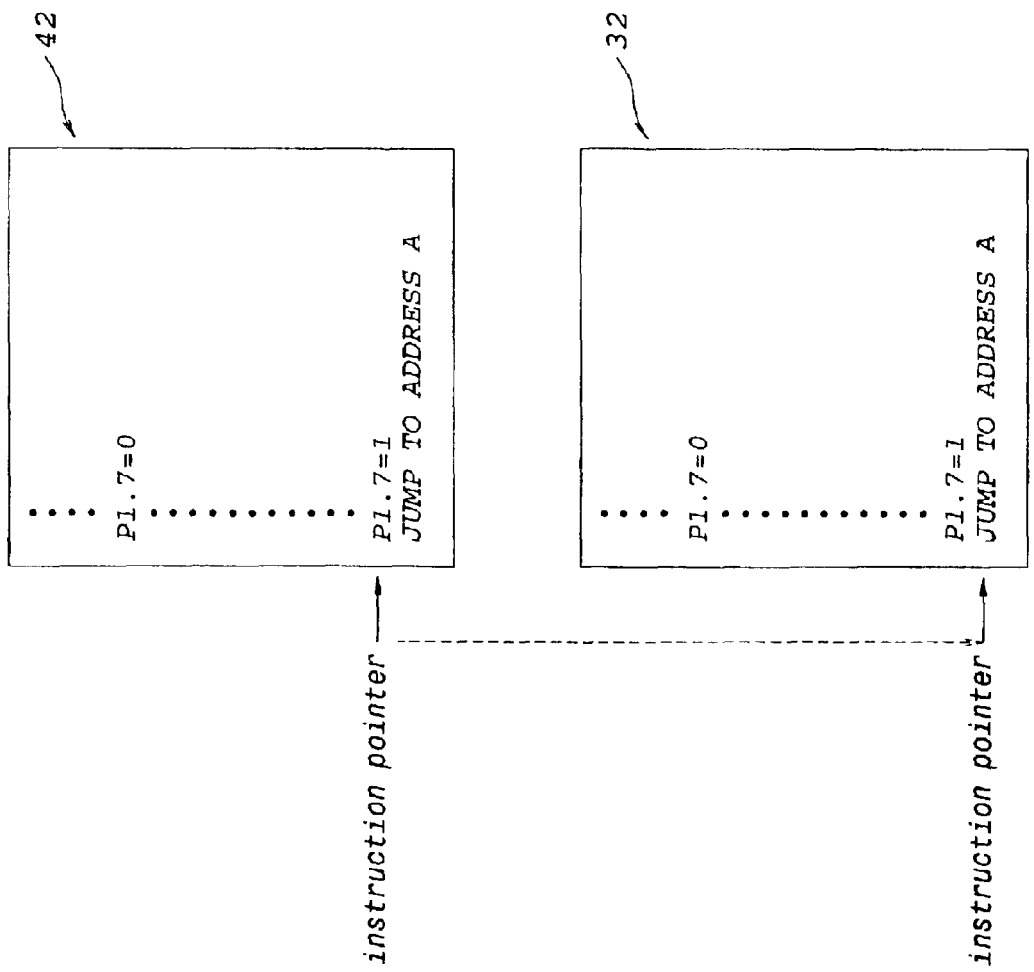
FIG. 10 is also a schematic diagram of the running of the instruction pointer complied with the present invention.

Step 660: When the new program 41 is written to the flash memory 3 completely, the renovation program 42 recorded in the SRAM 4 will control the 8031 micro-controller 1 to change the P1.7 pin to high, i.e., P1.7=1. It means that the mode is changed to the general mode. As well, the 8031 micro-controller 1 will execute the renovation program 32 recorded in the flash memory 3 instead of the renovation program 42 recorded in the SRAM 4 to perform the next machine code. As shown in FIG. 10, it means that the instruction pointer of the 8031 micro-controller 1 will point to the next machine code of the renovation program 32 recorded in the flash memory 3 after the P1.7 pin is changed to high.

Figure 11:
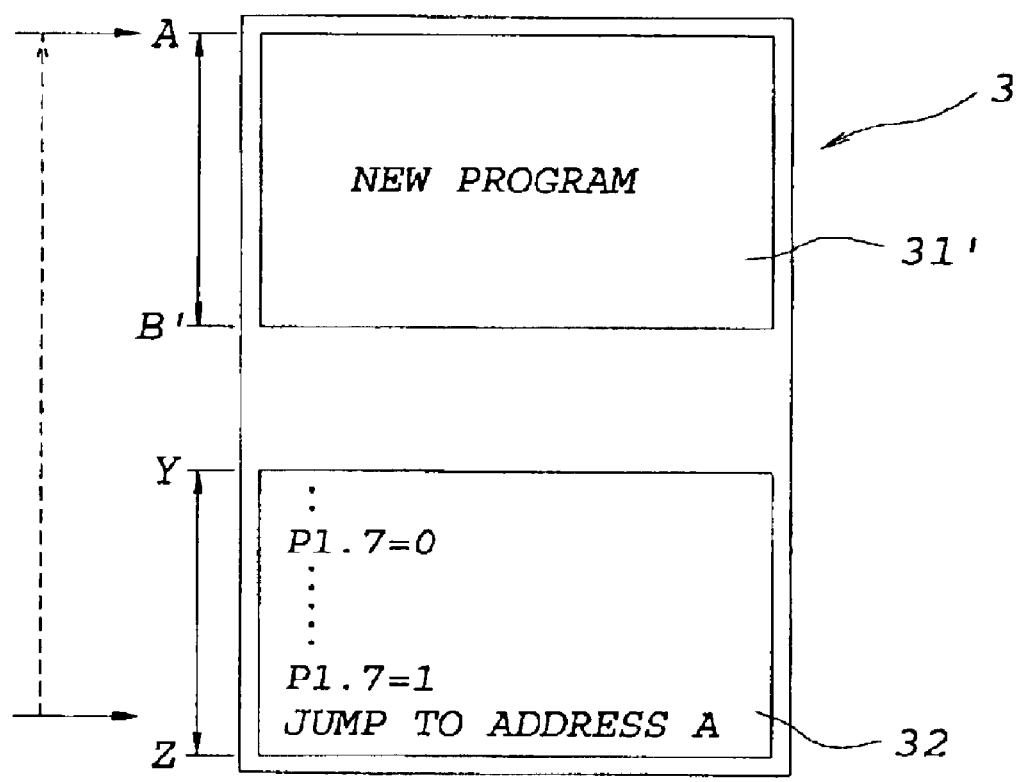
FIG. 11 is still a schematic diagram of the running of the instruction pointer complied with the present invention.

Step 670: Then, the renovation program 32 recorded in the flash memory 3 will make the 8031 micro-controller 1 operate with the new program 31' recorded in the flash memory 3. As shown in FIG. 11, the 8031 micro-controller 1 executes the last instruction "jump to address A", then the instruction pointer return to the beginning point of the new program 31' after this step is performed.

To sum up, the machine codes of the 8031 micro-controller can be changed through the design of the present invention. Thereby, codes can be renewed without the need of replacing the original flash memory.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

I claim:

1. A device capable of changing codes of a micro-controller comprising:

a micro-controller;

a flash memory connected to the micro-controller;

a static random access memory (SRAM) connected to the micro-controller; and a logic circuit connected to the micro-controller, the flash memory, and the SRAM;

wherein the logic circuit enables the micro-controller to fetch machine codes from the SRAM and write operation results to the flash memory when the logic circuit receives a change mode signal;

wherein when the logic circuit receives the change mode signal, voltage levels of an output enable (OE) pin and a write enable (WE) pin of the flash memory are by the logic circuit made equal respectively to voltage levels of a read (RD) pin and a write (WR) pin of the micro-controller such that WE=WR and OE=RD; and wherein the micro-controller copies a renovation program to the SRAM and executes the renovation program stored in the SRAM to copy the machine codes to the flash memory.

2. The device capable of changing codes of the micro-controller as claimed in claim 1, wherein the logic circuit enables the micro-controller to fetch machine codes from the flash memory and write operation results to the static random access memory (SRAM) when the change mode signal is not received by the logic circuit.

3. The device capable of changing codes of the micro-controller as claimed in claim 1, wherein the change mode signal is outputted from an output port pin of the micro-controller.

4. The device capable of changing codes of the micro-controller as claimed in claim 1, wherein said micro-controller is an 8031-series micro-controller.

5. The device capable of changing codes of the micro-controller as claimed in claim 1, wherein by the logic circuit, voltage levels of a write enable (WE) pin and an output enable (OE) pin of the static random access memory are made equal respectively to a high voltage level and a voltage level of a program store enable (PSEN) pin of the micro-controller, such that WE=the high voltage level and OE=PSEN, when the change mode signal is received by the logic circuit.

6. An apparatus capable of machine codes updating, the apparatus comprising:
a micro-controller;
a rewritable non-volatile memory, coupled to the micro-controller, for storing at least a renovation program;
a volatile memory coupled to the micro-controller; and
a logic circuit, coupled to the micro-controller, the rewritable non-volatile memory, and the volatile memory, wherein the logic circuit enables the micro-controller to fetch machines codes from the volatile memory and enables the rewritable non-volatile memory to be writable by the micro-controller when the logic circuit receives a change mode signal to operate in a renovation mode, wherein by the logic circuit operating in the renovation mode, voltage levels of an output enable pin and a write enable pin of the rewritable non-volatile memory respectively correspond to voltage levels of a read pin and a write pin of the micro-controller in order to enable the rewritable non-volatile memory to be writable by the micro-controller, and wherein the micro-controller copies the renovation program stored in the rewritable non-volatile memory to the volatile memory when the apparatus needs to perform machine codes updating, and by the logic circuit operating in the renovation mode, the micro-controller executes the renovation program stored in the volatile memory to copy the machines codes stored in the volatile memory to the rewritable non-volatile memory.

7. The apparatus according to claim 6, wherein the micro-controller executes the renovation program stored in the rewritable non-volatile memory to copy the renovation program stored in the rewritable non-volatile memory to the volatile memory when the apparatus needs to perform machine codes updating.

8. The apparatus according to claim 7, wherein the micro-controller executes the renovation program stored in the rewritable non-volatile memory to output the change mode signal to the logic circuit after the renovation program is copied to the volatile memory.

9. The apparatus according to claim 6, wherein by the logic circuit operating in the renovation mode, a voltage level of a program enable store pin of the micro-controller and a specific voltage level respectively correspond to voltage levels of an output enable pin and a write enable pin of the volatile memory in order to enable the micro-controller to fetch the machines codes from the volatile memory.

10. A device capable of changing codes of a micro-controller comprising:
a micro-controller;
an address latch comprising two input terminals respectively connected to a multiplex bus and an address latch enable (ALE) pin of said micro-controller;
a flash memory whose input terminals are connected to said address latch and an address bus of said micro-controller and whose output terminals are connected to the input terminal of said address latch, the flash memory having a renovation program and an general program both recorded therein;
a static random access memory (SRAM) whose input terminals are connected to said address latch and an address bus of said micro-controller and whose output terminal are connected to the input terminal of said address latch; and
a logic circuit whose input terminals are respectively connected to an output port pin, a read (RD) pin, a write (WR) pin, and a program store enable (PSEN) pin of said micro-controller and whose output terminals are respectively connected to a write enable (WE) pin and an output enable (OE) pin of said flash memory and a write enable (WE) pin and an output enable (OE) pin of said static random access memory, therein, voltages of the pins of the flash memory being WE=1 and OE=PSEN and voltages of the pins of the SRAM being WE=WR, and OE=RD as a voltage of the output port pin is high, the voltages of the pins of the flash memory being WE=WR and OE=RD and the voltages of the pins of the SRAM being WE=1 and OE=PSEN as the voltage of th output port pin is low;

wherein, during a period of changing code, the renovation program of the flash memory controls the micro-controller to copy the renovation program itself into the SRAM and then, by changing the voltage of the output port pin to low, makes the renovation program recorded in the SRAM control the micro-controller for replacing the general program of the flash memory with a new program.

11. The device capable of changing codes of the micro-controller as claimed in claim 10, wherein said micro-controller is an 8031-series micro-controller.

12. The device capable of changing codes of the micro-controller as claimed in claim 10, wherein a voltage of the output port pin is controlled by the renovation program for reading or rewriting of the flash memory and the SRAM.

13. The device capable of changing codes of the micro-controller as claimed in claim 10, wherein the flash memory is rewritable as the voltage of the output port pin is low.

14. The device capable of changing codes of the micro-controller as claimed in claim 10, wherein the SRAM is rewritable as the voltage of the output port pin is high.

15. The device capable of changing codes of the micro-controller as claimed in claim 10, wherein the output port pin is a seventh pin of port 1 of the micro-controller.

16. A method for changing a general program stored in a flash memory according to a renovation program stored in the flash memory, the method comprising the steps of:

copying the renovation program to a static random access memory (SRAM);

setting logic circuit connected to the flash memory and to the static random access memory (SRAM), to operate in a renovation mode which enables machine codes to be fetched from the static random access memory (SRAM) and written to the flash memory, wherein by the logic circuit operating in the renovation mode, voltage levels of an output enable (OE) pin and a write enable (WE) pin of the flash memory are made equal respectively to voltage levels of a read (RD) pin and a write (WR) pin of the micro-controller such that WE=WR and OE=RD; and executing the renovation program stored in the static random access memory (SRAM) to copy a new program stored in the static random access memory (SRAM) to the flash memory to update the general program.

17. The method as claimed in claim 16, further comprising a step of copying the new program from an outside interface into the static random access memory (SRAM).

18. The method as claimed in claim 16, further comprising a step of executing the new program stored in the flash memory.

19. The method as claimed in claim 16, wherein an address space of the renovation program in the SRAM is identical to an address space of the renovation program in the flash memory.

* * * * *